Aug. 14, 1923.  
H. SCHELHAMMER  
1,464,664  
METHOD AND APPARATUS FOR MANUFACTURING COMBS AND OTHER TOOTHED ARTICLES  
Filed Dec. 14, 1921

INVENTOR  
Herman Schelhammer  
BY  
ATTORNEY

Patented Aug. 14, 1923.

1,464,664

UNITED STATES PATENT OFFICE.

HERMAN SCHELHAMMER, OF WHITESTONE LANDING, NEW YORK, ASSIGNOR TO AMERICAN HARD RUBBER CO., OF NEW YORK, N. Y., A CORPORATION OF NEW YORK.

METHOD AND APPARATUS FOR MANUFACTURING COMBS AND OTHER TOOTHED ARTICLES.

Application filed December 14, 1921. Serial No. 522,310.

*To all whom it may concern:*

Be it known that I, HERMAN SCHELHAMMER, a citizen of the United States of America, and a resident of Whitestone Landing, in the county of Queens and State of New York, have invented new and useful Method and Apparatus for Manufacturing Combs and Other Toothed Articles, of which the following is a specification.

My invention relates to the manufacture of combs and similarly toothed articles and involves a process which comprises forming a comb blank with depressed portions or recesses corresponding to the gaps between the teeth, said portions providing webs of relatively thin cross sectional area corresponding to such gaps; and removing such webs by grinding with a grinder or plurality of grinders having the contour of the shape of the gap between adjacent teeth.

The invention further involves a method of producing combs of varying types which first consists in forming a blank from which the teeth are to be cut with web portions of less thickness than the adjacent portions which are relatively thicker and form the teeth, said web portions being adapted to become the gaps between said teeth; and finally removing such web portions by feeding the blank substantially axially against grinding wheels, or vice versa, whereby the advancement of the blank or grinding wheels causes the side surfaces of the grinding wheels to continue to operate upon the opposite faces of the adjacent teeth to smooth and polish the same as the peripheral cutting portion of the grinding wheel acts to remove said web portions of the blank.

The invention has for a further object the provision of a machine for cutting comb blanks, including in combination, a grinding wheel or wheels provided with a rounded peripheral cutting edge, and side cutting surfaces extending progressively outward from said peripheral cutting edge toward the centre of the wheel due to a gradual axial thickening of the wheel toward its axis.

In the drawings:—

Figure 1:
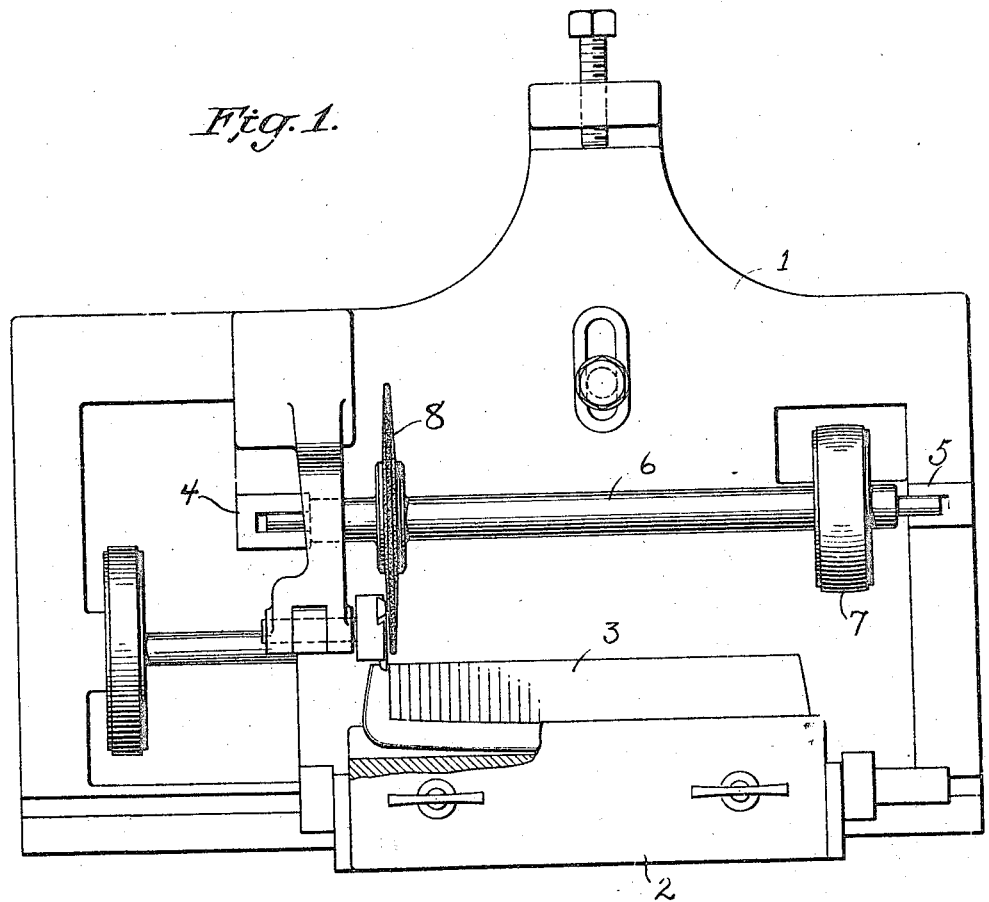
Figure 1 is a plan view of a comb cutting machine, with parts omitted, provided with a grinding wheel for cutting the teeth of combs, made in accordance with the invention.

Referring to the drawings 1 designates the frame of a comb cutting machine, which may be of any desired construction, the same being provided with a suitable comb clamp 2 in which is removably held a comb blank 3 in which it is desired to cut the teeth.

Supported in suitable bearings 4 and 5 of the frame 1 is a cutter shaft 6, which is arranged to be rotated through the medium of a belt 7. The cutter shaft 6 is provided with a grinding wheel 8, secured thereto, which is adapted to be fed into engagement with the comb blank 3 in order to cut the teeth therein.

The means for feeding the grinding wheel 8 in relation to the comb blank 3 are not shown or described as any well known means can be used for this purpose.

The grinding wheel 8, in accordance with the present invention, is preferably made of suitable abrasive material, such as emery, carborundum, or the like, of sufficient hardness to readily cut the teeth of combs.

The grinding wheel 8 is, in accordance with the present invention, formed so that the cross sectional area of the wheel will correspond with and have the same contour as the cut out portions to be formed between the comb teeth.

Figure 2:
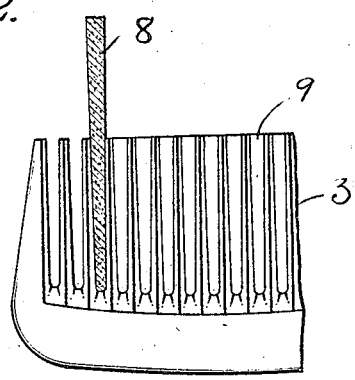
Figure 2 is an enlarged detail view with parts broken away of a partially cut comb, showing a portion of the grinding wheel in section.

By referring to Figure 2 it will be seen that the comb blank 3 is stamped, in the present instance, leaving uncut portions or webs 9 between the teeth, the grinding wheel 8, as shown, being made of suitable cross-sectional area to remove the webs. The web portions 9 when initially stamped, molded or otherwise formed, produce recesses corresponding to the gaps between the teeth, said recessed portions providing relatively thin web portions of the blank adjacent the thicker tooth portions thereof, through which web portions the grinding means can rapidly move without excessive frictional resistance or vibration.

In the present instance the grinding wheel 8 is provided with a relatively thin periphery having a rounded edge, the sides of the grinding wheel extending slightly outward toward the centre due to a gradual axial thickening of the wheel toward its axis so that the cross sectional area of the same will be progressively narrow toward the rounded periphery.

From the above description it will be seen that the grinding wheel, made as above described, will, as it enters the web or space between the comb teeth, cut not only along the periphery of the grinding wheel but along the sides as well, thereby affording a more uniform cutting and smoothing action upon the innermost portions of opposite faces of adjacent teeth than is the case with a steel saw where all the cutting is done by the teeth on the periphery.

It is also to be noted that due to the fact that the grinding wheel is made progressively thinner toward its outer periphery it will form the teeth of the comb so that they will be thinner at the outer ends, improving both the appearance and action of the comb.

The provision of the rounded edge on the periphery of the grinding wheel produces a rounded edge at the base of the teeth reinforcing the base of the teeth making them less liable to break. The rounded edge at the base of the teeth makes the comb easier to keep clean as there are no sharp corners to collect dirt. The rounded edge at the base of the teeth also improves the appearance of the comb, giving it a more artistic appearance.

A grinding wheel made as above described will cut ten times as many comb teeth, in blanks made of hard rubber for example, as will a steel saw without resharpening.

A grinding wheel made as above described will also act to cut the teeth in a hard rubber blank, for example, much smoother thereby doing away with a great deal of the polishing ordinarily employed when steel saws are used. The same is also much better adapted to cutting the teeth of large combs as the grinding wheel will not chip the edges of the teeth as frequently occurs with steel saws to thereby spoil the comb.

The grinding wheel above described is particularly adapted for use in cutting the teeth of hard rubber blanks, in which the teeth are either stamped or unstamped, although the same can be used with equal advantage on comb blanks made of other materials.

While the invention has been described with particular reference to the details of construction, the same is not to be considered as limited thereto, as many changes can be made and still fall within the scope of the invention set forth in the following claims.

What I claim is:—

1. The method of making combs which consists in forming a comb blank with recesses corresponding to the gaps between the teeth leaving webs corresponding to such gaps, and removing such webs by grinding with a grinder or grinders having the contour of the shape of the gap.

2. The method of making combs comprising the forming of a comb blank with web portions adapted to become the gaps between the teeth, and removing such web portions by feeding the blank substantially axially against a grinding wheel or wheels, said wheels being formed with peripheral cutting portions and side cutting surfaces, whereby the advancement of the blank or the vice versa action of the grinding wheel causes the side cutting surfaces to continue to cut the opposite faces of adjacent teeth as the peripheral cutting portions act to remove said web portions of the blank.

3. A comb cutting machine for cutting the teeth of comb blanks, comprising in combination a grinding wheel having a rounded peripheral cutting edge, and side cutting surfaces extending progressively outward from said rounded peripheral cutting edge toward the centre of said wheel due to a gradual axial thickening of the wheel toward its axis.

In testimony whereof I have signed this specification in the presence of two subscribing witnesses.

HERMAN SCHELHAMMER.

Witnesses:
GEORGE C. STRACHAN,
WM. R. MULLEE.